UNITED STATES PATENT OFFICE.

CARL HERING, OF PHILADELPHIA, PENNSYLVANIA.

METHOD OF MAKING ELECTRODES FOR SECONDARY BATTERIES.

SPECIFICATION forming part of Letters Patent No. 429,274, dated June 3, 1890.

Application filed May 24, 1889. Renewed April 18, 1890. Serial No. 348,440. (No specimens.)

*To all whom it may concern:*

Be it known that I, CARL HERING, a citizen of the United States, residing at Philadelphia, in the county of Philadelphia and State of Pennsylvania, have invented certain new and useful Improvements in Secondary Batteries, of which the following is a specification.

My invention relates to the art or method of making positive and negative plates of such batteries and the processes therefor.

The object of my invention is to make solid self-sustaining plates of peroxide of lead, to form them, to render them porous, to render them stronger, to harden them, and to make cathodes of fine crystals of lead instead of reduced oxide; and it consists in devices by which these ends are attained.

In the United States patent for secondary batteries, No. 372,468, dated November 1, 1887, and issued to me, I described a method by which solid self-sustaining plates of peroxide of lead can be made for use in secondary batteries. It consists essentially of using as a binding material for the pulverulent oxides a soluble salt of lead. I have found that the salt of lead best adapted to this purpose is the acetate, by the use of which I attain a better adhesion of the particles of the oxides than by any other. The chief difficulty in making such plates is to have them porous, in order that they will form more evenly throughout and not crack, blister, laminate, or remain soft inside while forming. To overcome this difficulty, I mix with the usual oxides of lead a reducible compound—salt or oxide of lead—of such a nature that when electrolytically converted into the peroxide it shall occupy a smaller bulk or volume and thus leave an empty or porous space surrounding or in contact with the peroxide so formed. I increase the surface of the electrode by puncturing the molded material before drying. To render the plates harder and stronger before mounting, they are immersed in sulphuric acid. The length of time for this immersion will depend on the extent of the hardening desired. If the mixture composing such plates before forming contains no conducting material, it will form slowly and with difficulty. I therefore mix some peroxide of lead with the other constituents of the material for the plates.

I prefer to make the peroxide plates as follows: A dry mixture of powdered peroxide, minium, and lead carbonate (or sulphate) is mixed with a solution of acetate of lead to a stiff paste. This is then pressed into a mold and punctured in numerous places and dried in an oven. It is then hardened by immersion in sulphuric acid, after which it is mounted and formed.

I do not limit myself to the use of the carbonate or sulphate of lead in the above manufactured plate, since it is evident that in accordance with the principles of my invention I may substitute therefor any substance which when electrolytically converted into the peroxide of lead occupies a smaller space than previously.

Secondary-battery plates are usually formed in sulphuric acid. I prefer, however, to form them in an alkaline-sulphate solution—such as sodium or potassium sulphate—as this prevents in a degree the formation of a peculiar white growth around the supports, which attacks those supports when made of lead. After they are formed such growths do not appear. The plates may be furthermore strengthened and hardened by a process I will call "treating." This consists in immersing the plate in a solution of a soluble lead salt or compound—such, for instance, as acetate of lead—then drying them and afterward forming them again with a positive electric current, as usual. This may be repeated as often as desired, thereby giving the plate any degree of hardness and density. By this process of treatment the soluble salt of lead on drying forms a thin coating on the surfaces of the porous spaces, and on its conversion to peroxide decreases the size of the porous spaces without diminishing their number.

To still further strengthen the plates and render their surface very hard, I electroplate them, after they are formed, with peroxide of lead by supporting them in a bath of a soluble lead salt—such as the nitrate—together with any suitable cathode, and passing an electric current through this, making the plates the anode. They will then become coated with a layer of deposited peroxide of lead, which is about as hard as highly-tempered steel.

The cathode of the secondary battery is made as follows: A quantity current is passed through an acid bath made of a soluble salt of lead—such, for instance, as the nitrate. The anode in this bath is a slab of lead, and the cathode any suitable material, but, preferably, straps or wires of lead terminating in points. Arborescent crystals of lead will then be formed at the cathode in large quantities. These crystals are exceedingly thin and possess the property when fresh of adhering to each other or interlocking when pressed together, thus forming a very porous, tenacious mass which is soft, pliable, and fibrous, almost resembling a textile material. These crystals are gathered and kept under water until a sufficient quantity is obtained for a plate or block. They are then put into a mold of any desired size and shape and sufficient pressure is applied to make them adhere to each other. By this means I obtain a porous strongly-coherent plate of finely-divided lead, which serves admirably for the plates of a secondary battery. After washing and being put in contact with a conductor the plate or block is ready for use in the battery, requiring no further charge.

I claim as my invention—

1. The within-described process of making and hardening a plate adapted to become a secondary-battery electrode, consisting in mixing lead oxide with a solution of a salt of lead to a paste, pressing it in a mold, drying it, and immersing it in sulphuric acid, substantially as described.

2. The within-described process of making and forming a secondary-battery electrode, which consists in mixing lead oxide with a solution of a salt of lead to a paste, pressing it in a mold, drying it, immersing it in an alkaline-sulphate solution, as of sodium sulphate or its equivalent, and passing an electric current through it.

3. The within-described process of treating a secondary-battery electrode, consisting in immersing a formed electrode in a solution of a soluble lead salt, drying the electrode, and re-forming it.

4. The within-described process of superficially hardening a secondary-battery anode, consisting in electroplating the surface of the anode after it is formed with a hard peroxide of lead.

5. The within-described process of making a secondary-battery electrode, which consists in depositing under current arborescent crystals of lead, placing such crystals in a mold, and compacting the mass under pressure, substantially as described.

6. The within-described process of making a fibrous lead plate, which consists in passing electric current through a solution of a soluble salt of lead with a lead anode and compressing the arborescent deposit formed on the cathode, substantially as specified.

CARL HERING.

Witnesses:
GEORGE HOUSE,
HENRY V. MASSEY.